(12) United States Patent
Hanley et al.

(10) Patent No.: US 7,090,527 B2
(45) Date of Patent: Aug. 15, 2006

(54) TRANSCEIVER DELATCHING MECHANISM

(75) Inventors: Michael Francis Hanley, Rochester, MN (US); James Robert Moon, Oronoco, MN (US); Bruce P. Kruger, Oronoco, MN (US); David Peter Gaio, Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/251,720

(22) Filed: Oct. 17, 2005

(65) Prior Publication Data

US 2006/0121769 A1    Jun. 8, 2006

Related U.S. Application Data

(60) Provisional application No. 60/633,643, filed on Dec. 6, 2004.

(51) Int. Cl.
*H01R 13/64* (2006.01)
(52) U.S. Cl. ..................................... 439/372
(58) Field of Classification Search ................ 439/372, 439/352–353, 357, 152–160, 377, 153; 361/727–728, 361/654–656, 759, 685, 683, 816
See application file for complete search history.

(56) References Cited

U.S. PATENT DOCUMENTS

| | | | |
|---|---|---|---|
| 5,901,263 A | 5/1999 | Gaio et al. .................... 385/92 |
| 6,439,918 B1 | 8/2002 | Togami et al. ............... 439/372 |
| 6,652,306 B1 * | 11/2003 | Karamatsu et al. ......... 439/310 |
| 6,692,159 B1 | 2/2004 | Chiu et al. ..................... 385/53 |
| 6,744,963 B1 | 6/2004 | Hwang ........................ 385/139 |
| 6,789,958 B1 | 9/2004 | Ahrens et al. ................. 385/92 |
| 6,840,680 B1 | 1/2005 | Chiu et al. ..................... 385/53 |
| 6,851,867 B1 | 2/2005 | Pang et al. .................... 385/88 |
| 6,890,206 B1 | 5/2005 | Distad et al. ................ 439/372 |
| 6,899,556 B1 * | 5/2005 | Nishida et al. ............. 439/188 |
| 6,916,123 B1 * | 7/2005 | Kruger et al. ................. 385/92 |
| 6,927,973 B1 * | 8/2005 | Song et al. .................. 361/685 |
| 6,929,403 B1 * | 8/2005 | Arciniegas et al. ........... 385/55 |
| 6,945,809 B1 * | 9/2005 | Ishigami et al. ............ 439/372 |

\* cited by examiner

*Primary Examiner*—J. F. Duverne
(74) *Attorney, Agent, or Firm*—Allen, Dyer, Doppelt, Milbrath & Gilchrist, P.A.

(57) ABSTRACT

The present invention relates to a delatching mechanism for an electronic module, such as an opto-electronic transceiver or a copper transceiver, for locking the electronic module in a host cage. The delatching mechanism enables a conventional small form factor (SFP) sized module to be unlatched while a cable remains engaged therein. A manually engageable lever, such as a bail handle, is rotatably connected on one end of a pivoting latch, and includes a projection for abutting against the module housing for distributing the force applied to the bail to one end of the pivoting latch, whereby the other end of the pivoting latch rotates away from engagement with the host cage.

20 Claims, 12 Drawing Sheets

TRANSCEIVER DELATCHING MECHANISM

CROSS-REFERENCE TO RELATED APPLICATIONS

The present invention claims priority from U.S. Patent Application No. 60/633,643 filed Dec. 6, 2004, which is incorporated herein by reference for all purposes.

TECHNICAL FIELD

The present invention relates to a transceiver delatching mechanism, and in particular to pivoting bail delatching mechanism for small form factor pluggable (SFP) optical and copper transceivers.

BACKGROUND OF THE INVENTION

Conventional transceiver delatching mechanisms, such as those disclosed in U.S. Pat. No. 5,901,263 issued May 4, 1999 to Gaio et al; U.S. Pat. No. 6,439,918 issued Aug. 27, 2002 to Togami et al; U.S. Pat. No. 6,789,958 issued Sep. 14, 2004 to Ahrens et al; and U.S. Pat. No. 6,840,680 issued Jan. 11, 2005 to Chiu et al, include a pivoting lever or bail, which when rotated results in a second pivoting element being rotated out of engagement with a host cage or rail system. The bails in the aforementioned devices are rotated through a 90° arc to disengage the latching mechanism, and are therefore prevented from rotating when a fiber optic cable is in position in the optical coupler of the transceiver, because the fiber optic cable will obstruct the cross bar of the bail.

Other transceiver delatching mechanisms with a pivoting lever or bail and a sliding wedge are disclosed in U.S. Pat. No. 6,692,159 issued Feb. 17, 2004 to Chiu et al; U.S. Pat. No. 6,744,963 issued Jun. 1, 2004 to Hwang; U.S. Pat. No. 6,840,680 issued Jan. 11, 2005 to Chiu et al; U.S. Pat. No. 6,851,867 issued Feb. 8, 2005 to Pang et al; and U.S. Pat. No. 6,916,123 issued Jul. 12, 2005 to Kruger et al. The sliding wedges in the aforementioned devices are not ideal for small form factor transceivers, since they are relatively large and require a specially designed track system for reciprocating therein.

Another solution for a small form factor delatching mechanism is disclosed in U.S. Pat. No. 6,890,206 issued May 10, 2005 to Distad et al, which discloses a single lever mechanism for bending the cage assembly away from transceiver housing, thereby delatching the transceiver's latch from the cage's latch.

"Copper" transceiver's are used as short distance patch cables, typically in datacom or telcom equipment rooms, to establish a link between ports in the same room or even in the same cabinet without having to convert to an optical signal and back again to an electrical signal. A multi-conductor electrical cable extends between a pair of copper transceivers, and is soldered at each end thereof directly to the printed circuit board within each of the copper transceivers. Each copper transceiver housing has the size and features of a typical SFP transceiver housing; however, since the electrical cable is permanently fixed within each housing, the typical bail latching mechanism, requiring approximately 90° of rotation is not suitable.

An object of the present invention is to overcome the shortcomings of the prior art by providing a relatively simple rotating delatching mechanism requiring only a relatively small amount of rotation for delatching a transceiver's latch from a host cage's latch.

SUMMARY OF THE INVENTION

Accordingly, the present invention relates to an electronic module for plugging into a host receptacle comprising:
a housing having a first abutment surface;
a printed circuit board mounted within the housing having an electrical connector at one end thereof for electrically connecting the module to a mating connector in the host receptacle;
a latch pivotally connected to the housing about a first axis for releasably holding the module in the host receptacle;
a lever pivotally connected to the latch about a second axis, the lever including a first camming surface;
whereby the lever rotates about the second axis until the first camming surface abuts the first abutment surface, thereafter continued rotation of the lever causes rotation of the latch about the first axis for disengaging the latch from the host receptacle.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
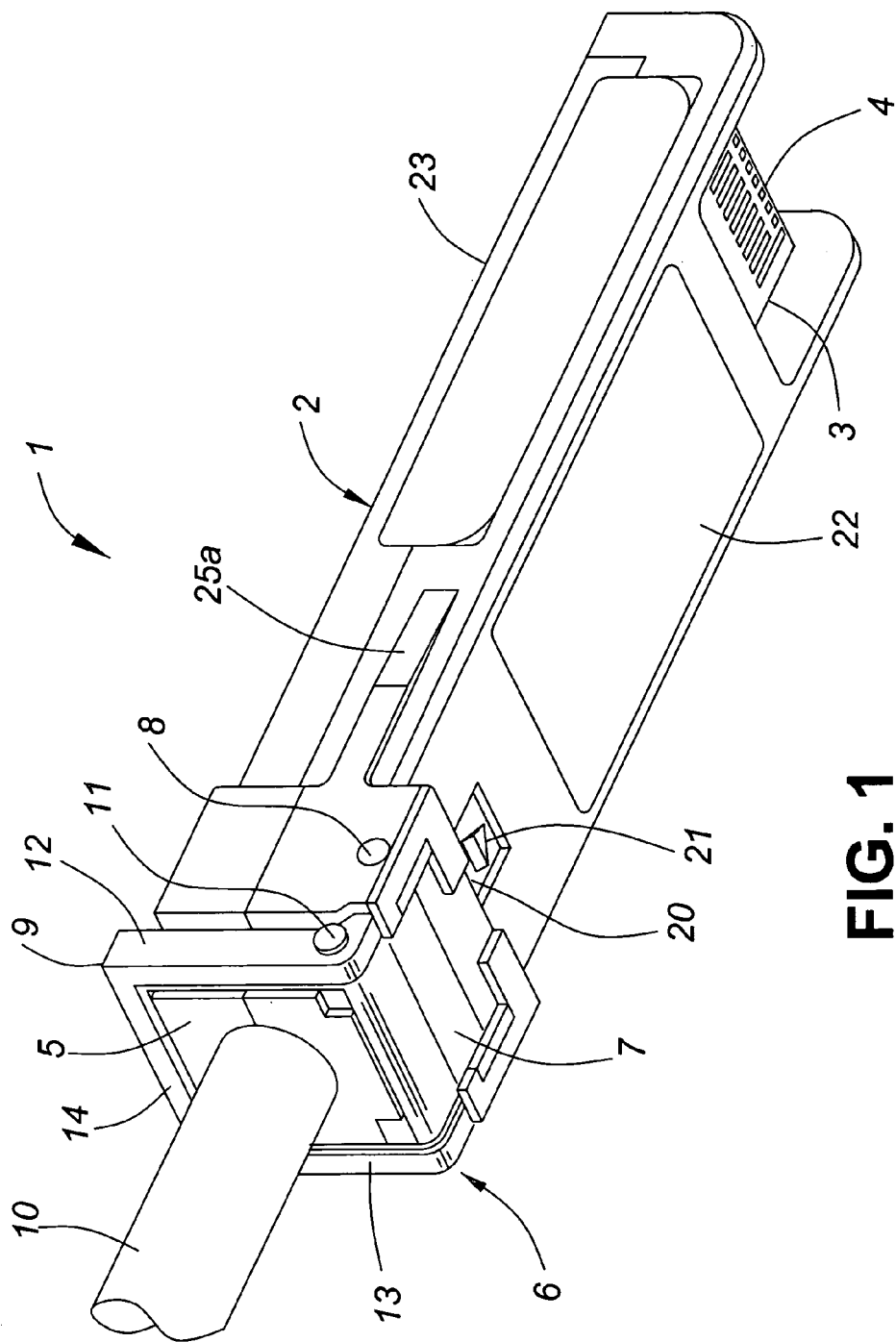
FIG. 1 is an isometric view of an electronic module with a delatching mechanism in accordance with the present invention.

With reference to FIG. 1, a pluggable electronic module 1 according to the present invention includes a generally rectangular housing 2, a printed circuit board 3 longitudinally extending therein, a hot-pluggable rear electrical connector 4, and a front cable connector 5. The rear electrical connector 4 can take any suitable form depending upon the type of mating electrical connector; however, the illustrated card edge connector is preferred. The illustrated front cable connector 5 is in the form of a block for receiving a multi-conductor cable 10 soldered to the printed circuit board 3; however, other front cable connectors can be provided depending upon the function of the module 1, e.g. a bi-directional opto-electronic transceiver requires a duplex optical connector (LC or SC), a uni-directional opto-electronic module requires a single (LC or SC) connector. Conventional transceivers would also include some form of electro-optical converter, e.g. a photo-detector and/or a laser; however, copper transceivers do not. The electronic module 1 is slid into a host receptacle, e.g. a cage or guide rail, system with an electrical connector corresponding to the electrical connector 4, which is mounted on a host printed circuit board in a host device.

Figure 2:
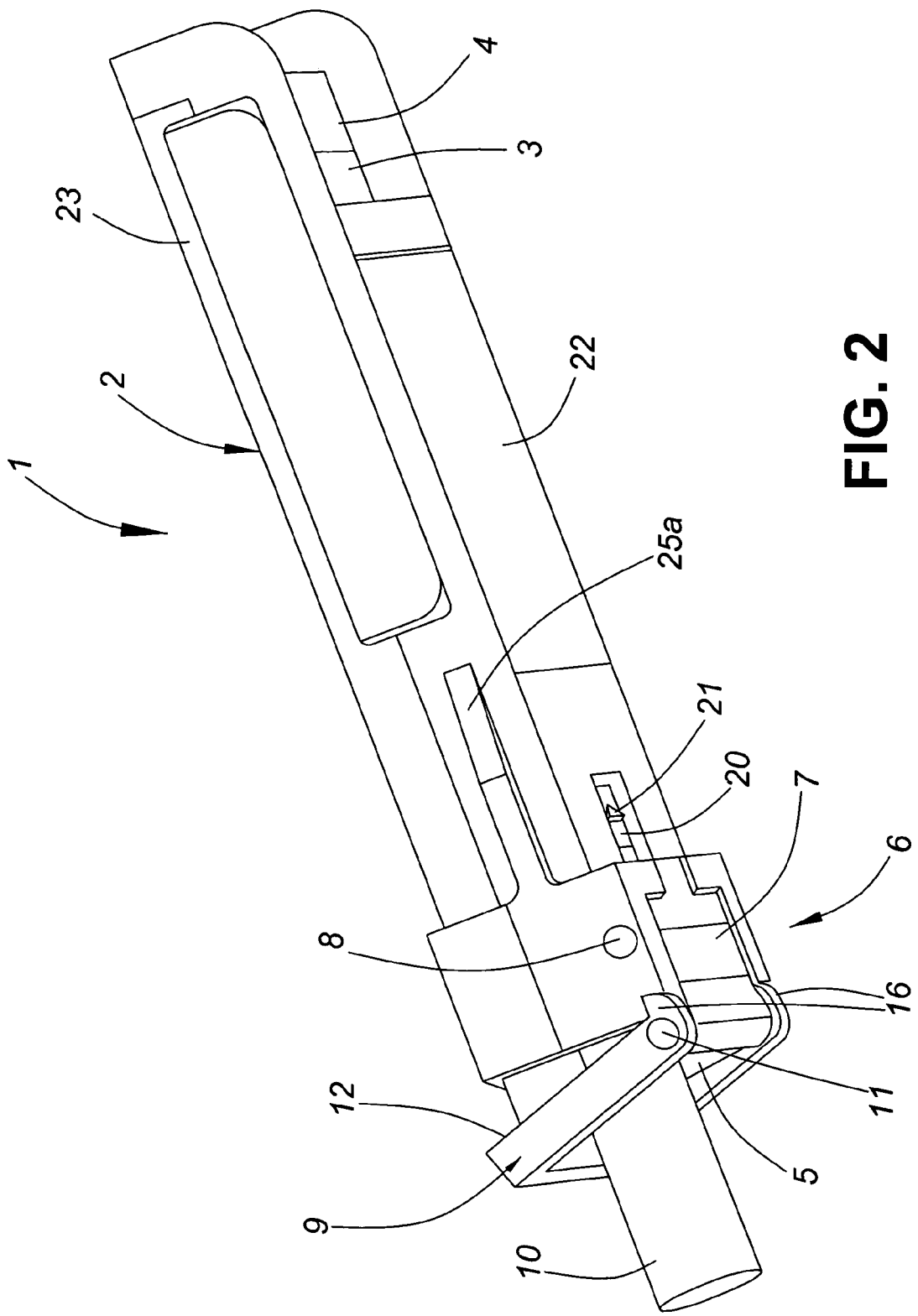
FIG. 2 is an isometric view of the electronic module of FIG. 1 with the delatching mechanism in a release position.
Figure 3:
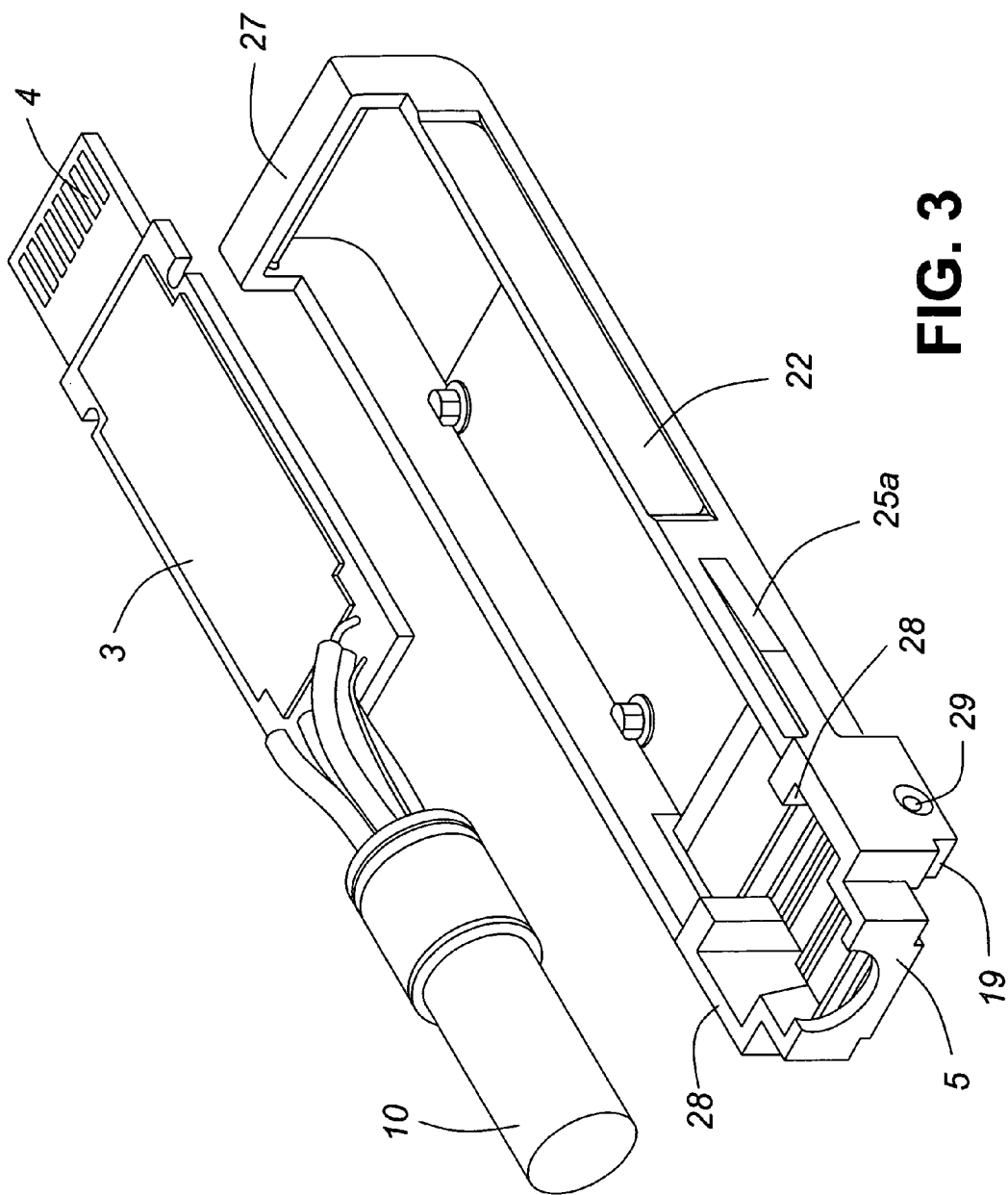
FIG. 3 is an exploded view of components of the electronic module of FIGS. 1 and 2 illustrating a first step in an assembly process.
Figure 4:
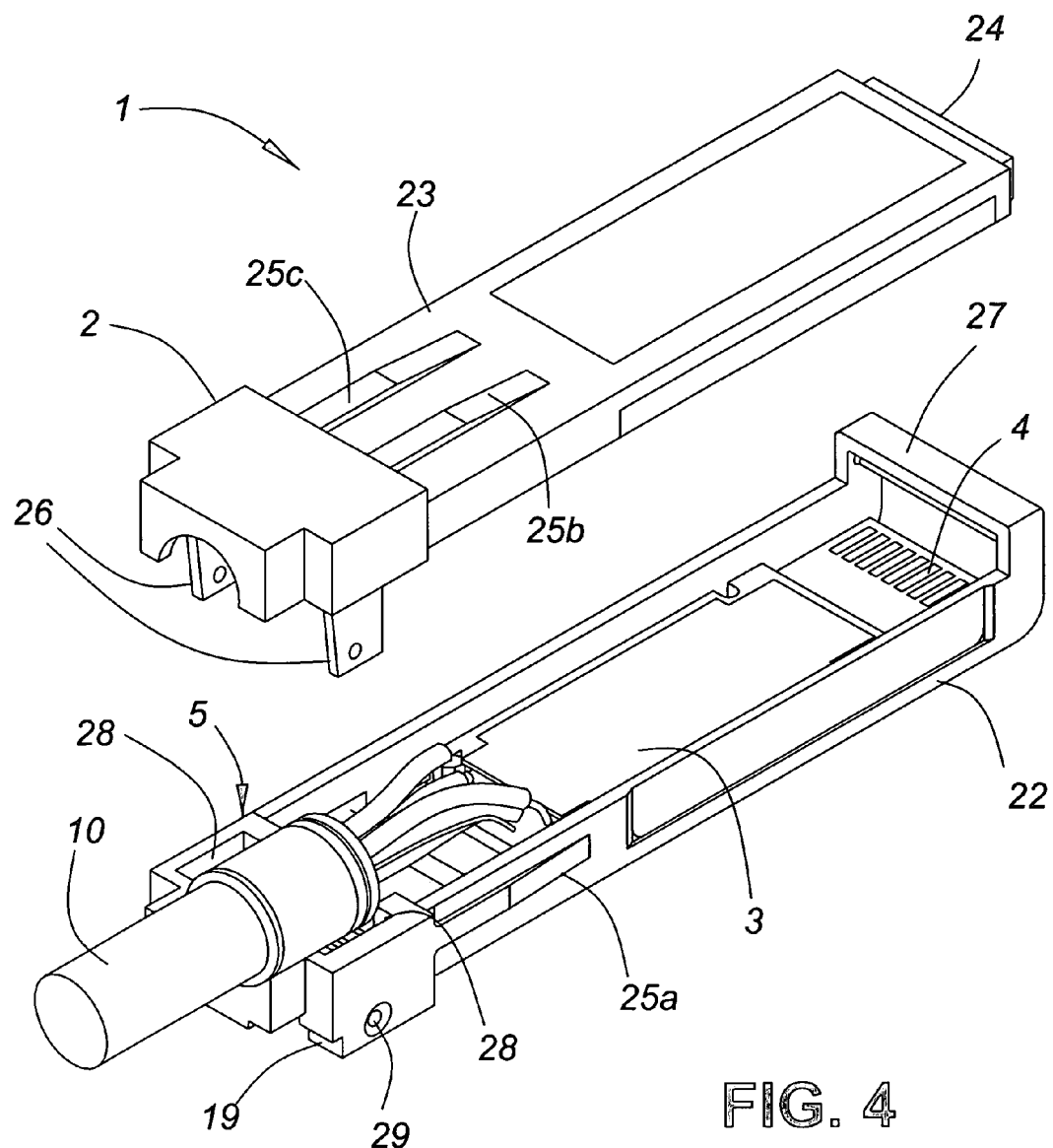
FIG. 4 is as exploded view of components of the electronic module of FIGS. 1 to 2 illustrating a second step in the assembly process.
Figure 5:
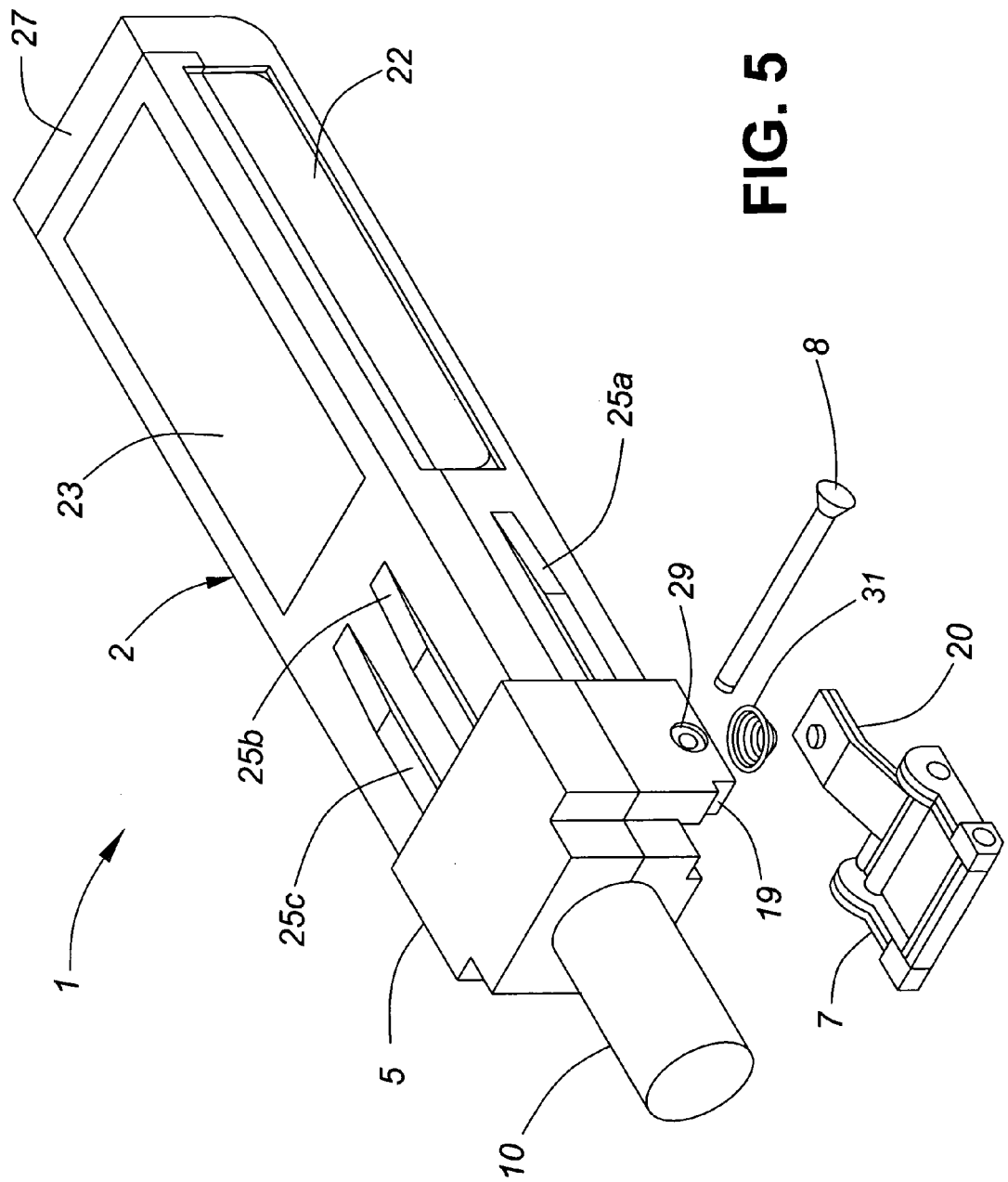
FIG. 5 is as exploded view of components of the electronic module of FIGS. 1 to 2 illustrating a third step in the assembly process.

A de-latching mechanism 6 is mounted on the bottom of the housing 2, and includes a latch 7 pivotally connected proximate the middle thereof to the housing 2 about a first axis defined by a first pivoting pin 8. A lever, preferably in the form of a bail handle 9, extends around the front end of the housing 2, and is pivotally connected to a first end of the latch 7 about a second axis, parallel to the first axis, defined by a second pivoting pin 11. The bail handle 9 includes a pair of side arms 12 and 13, lower ends of which are pivotally connected to the second pivoting pin 11, and upper ends of which are connected to a cross bar 14 extending therebetween. The bail handle 9 can be replaced by a single arm or other form of lever. An eccentric projection 16 extends substantially perpendicularly from each of the lower ends of the side arms 12 and 13, and includes a lower rounded surface 17 and an upper flat camming surface 18 (see FIG. 6). Each projection 16 extends into a recessed area 19, in the housing 2, which includes an abutment surface. Preferably, each recessed area 19 is a rectangular step or indentation formed in the front end of the housing 2, e.g. in the lower front corners of the cable connector block 5. The lower rounded surface 17 enables the projection 16, and therefore the bail handle 9, to act like a first class lever and rotate about the second axis, i.e. the second pivoting pin 11 acting like a fulcrum, without contacting the wall of the housing 2 until the camming surface 18 engages the abutment surface, as seen in FIG. 2. When the camming surface 18 engages the abutment surface in the recessed area 19, the bail handle 9 is not only able to pivot about the second axis; but, further force on the bail handle 9 causes the bail handle 9 to pivot about a third axis defined by the intersection of the camming surface 18 and the abutment surface. Accordingly, the bail handle 9 also becomes a second class lever with the fulcrum at the intersection of the camming surface 18 and the abutment surface, whereby any added force on the bail handle 9 is applied through the pivot pin 11 to the first end of the latch 7, thereby pivoting the first end of the latch away from the housing 2. A second end of the latch 7 includes a release arm 20 with a latching finger 21, which engages a corresponding latching opening on the host cage or guide rail system. Pivoting the first end of the latch 7 away from the housing 2 into a release position (FIG. 2) causes the release arm 20 and the latching finger 21 to detract into an opening in the housing 2, thereby releasing the latching finger 21 from the latching opening on the host cage enabling the transceiver 1 to be removed therefrom. In the latched position, the latch 7 is recessed into the housing 2 with only the latching finger 21 extending outwardly therefrom. In the unlatched or release position, the first end of the latch 7 is pivoted outwardly from the housing 2, while the latching finger 21 is detracted further into the housing body, whereby the latching finger 21 no longer extends therefrom.

With reference to FIGS. 3 to 7, the electronic module 1, in the form of a copper transceiver, is assembled by first connecting, e.g. soldering, an end of the multi-conductor cable 10 to the printed circuit board 3, and mounting the assembly into either a housing bottom 22 or a housing top 23, which combine to form the housing 2. The housing bottom 22 and the housing top 23 are at least partially formed from a conductive material, and preferably comprise a cast metal. The housing top 23 includes a thin tail section 24, and a pair of generally rectangular tapering ears 26, i.e. tenons, extending therefrom for mating with the housing bottom 22. The tail section 24 has smaller dimensions, i.e. length and width, than the remainder of the housing top 23. A U-shaped bar 27 extends across the back of the housing bottom 22 providing a bearing surface and a hold-down bar for the thin tail section 24 of the housing top 23 During assembly, the tail section 24 is inserted under the bar 27, and the housing top 23 is rotated down until the ears 26 are received in mating recesses 28, i.e. mortises, in the housing bottom 22 (see FIG. 4). The first pin 8 is then inserted through holes 29 in the sides of the housing bottom 22, through holes in the ears 26, and through a bushing extending across the middle of the latch 7, thereby securing the housing top 23 to the housing bottom 22, and pivotally mounting the latch 7 to the housing bottom 22. A spring 31 is positioned between the release arm 20 and the housing bottom 22 to spring bias the release arm 20 into a latched position, whereby a sufficient force must be applied to the bail handle 9 to overcome the spring force of the spring 31 to pivot the latch 7 into an unlatched or release position.

A solid rectangular conductive projection 25a, extends outwardly from the housing bottom 22 for contacting the host receptacle and providing electromagnetic interference (EMI) protection. The projection 25a extends rearwardly from the cable connector 5 longitudinally along the side of the housing bottom 22. Preferably, the projection 25a includes a sloped rear ramp portion at a leading edger thereof, which gradually decreases in height from the front to the back of the housing 2 to facilitate insertion of the module into a host receptacle, whereby the walls of the cage will engage the ramp portion first and gradually ride up the ramp portion to the main body of the projections. Similarly, solid rectangular projections 25b and 25c, similar to projection 25a, extend longitudinally along the top of the housing top 23 for contacting a top portion of a host receptacle. Another ramp 25d (see FIG. 12) extends along the side of the housing top 23 for added EMI protection. Projections 25a and 25d make the width to the housing 2 slightly larger than the width of the host receptacle, whereby the projections 25a and 25d frictionally engage the sides of the host receptacle.

Figure 6:
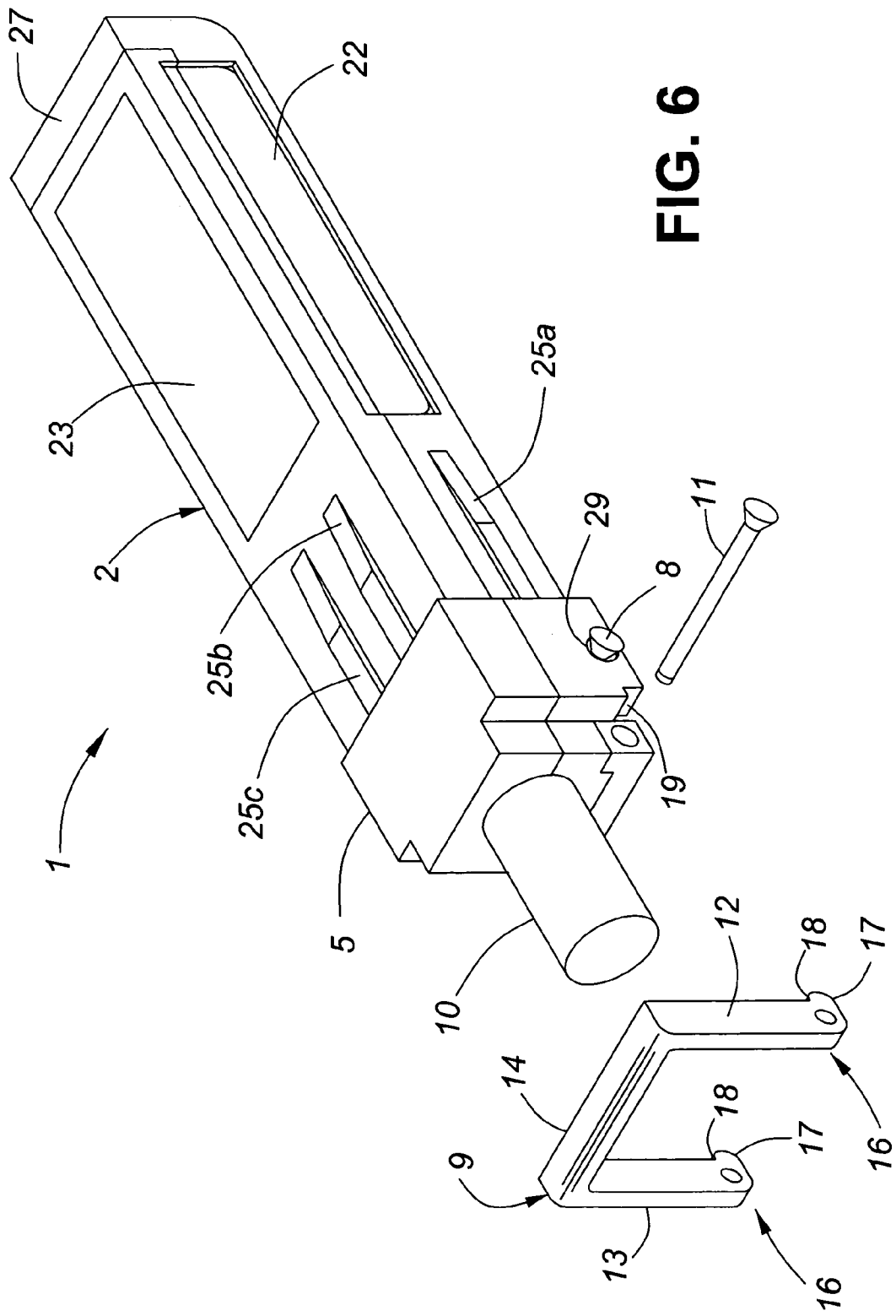
FIG. 6 is as exploded view of components of the electronic module of FIGS. 1 to 2 illustrating a fourth step in the assembly process.

The next step in the assembly, as illustrated in FIG. 6, includes the insertion of the second pivoting pin 11 through a hole in the lower end of the side arm 12, through a bushing in the end of the latch 7, and through a hole in the lower end of the side arm 13.

Figure 7:
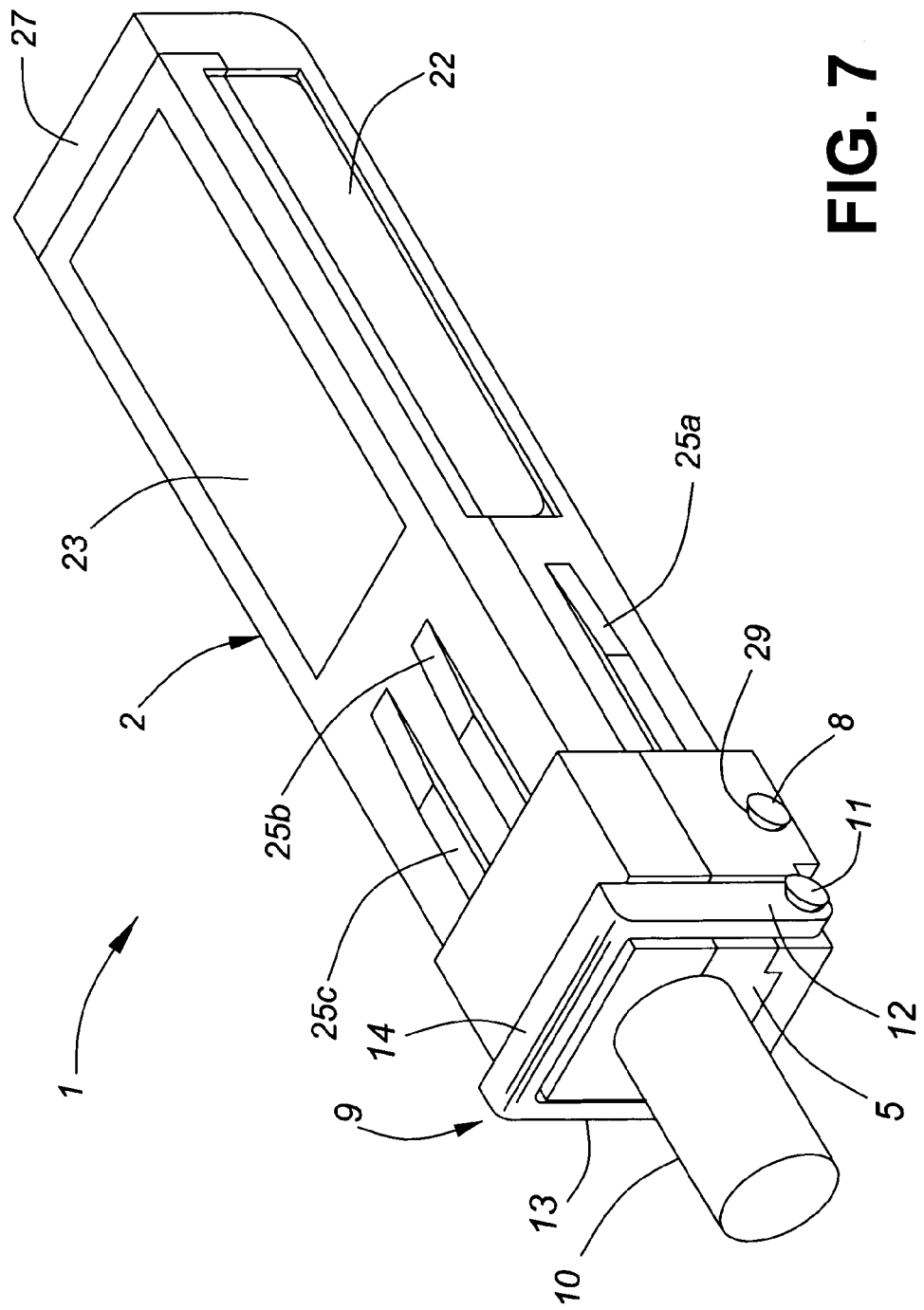
FIG. 7 is as exploded view of components of the electronic module of FIGS. 1 to 2 illustrating a fifth step in the assembly process.

Preferably, the first and second pivoting pins 8 and 11 are identical to each other to simplify the supply and the assembly processes. The first and second pivoting pins 8 and 11 are tapered at the insertion end to facilitate insertion and part alignment, and have a flattened head at the other end for engaging a recessed annular wall in the countersunk hole 29. Moreover, at the head end, the cross section of the first and second pivoting pins 8 and 11 changes from circular to oblong or oval, so that the major diameter of the oval is large enough to form a slight press fit with the hole 29 at the wall of the housing bottom 22 and of the side arm 12. Accordingly, the final assembly step, see FIG. 7, is forcing the head end of the first and second pivoting pins 8 and 11 into engagement with the side of the housing bottom 22 and the side arm 12, respectively. The first and second pins 8 and 11 can be pressed out, if necessary, without damaging the housing bottom 22 or the first and second pins 8 and 11, to facilitate repair or the recycling of parts.

Figure 8:
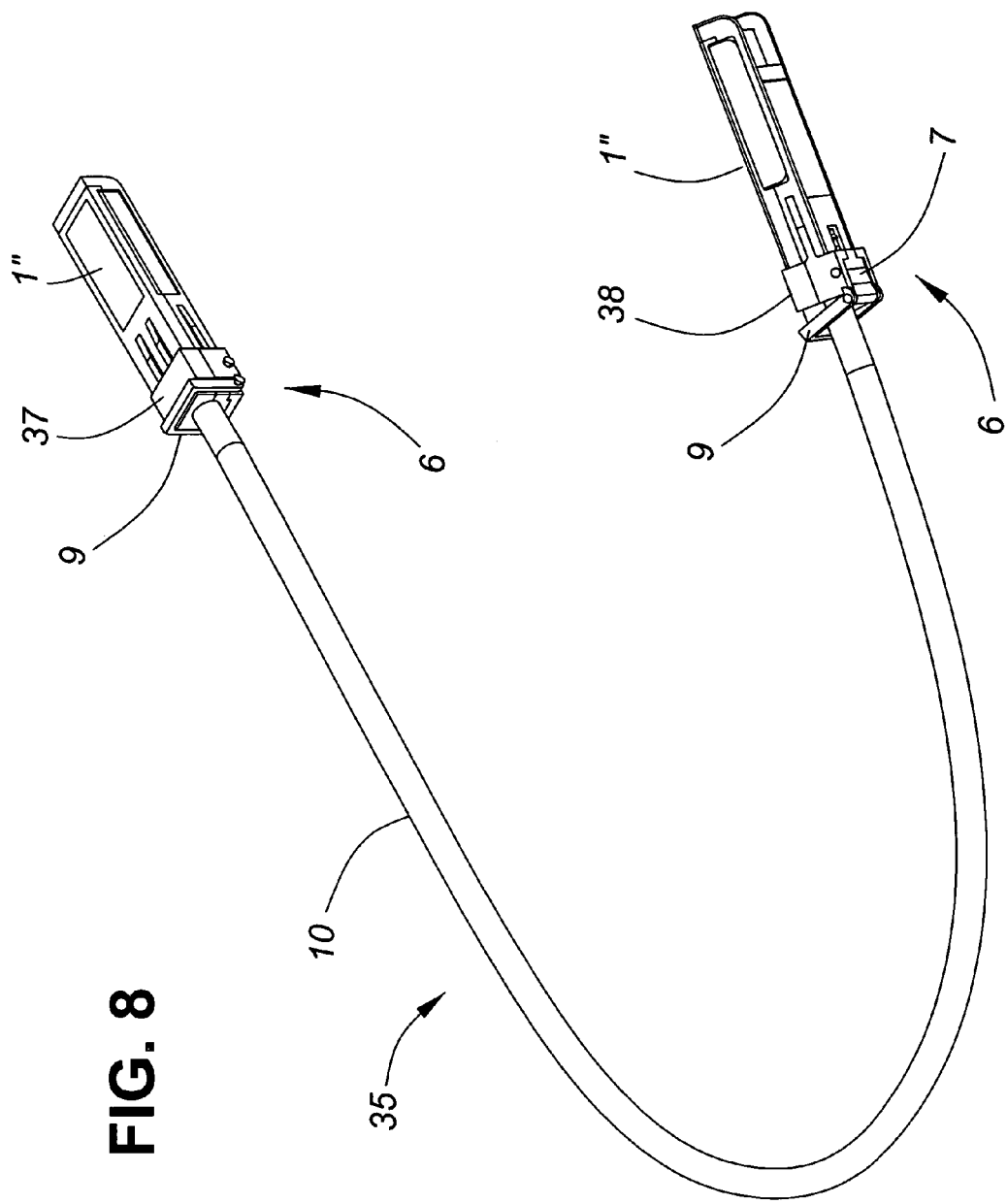
FIG. 8 is a perspective view of a copper transceiver patch cable including the electronic module of FIGS. 1 and 2 on either end thereof.

With reference to FIG. 8, a patch cable 35 comprises the multi-conductor electrical cable 10 and copper transceivers 1' and 1", similar to electronic module 1, on either end thereof. Each of the copper transceivers 1' and 1" includes the delatching mechanism 6, as hereinbefore described with reference to FIGS. 1 to 7. Since the cable 10 is permanently installed inside the copper transceivers 1' and 1", it is imperative that each bail lever 9 need only be rotated through a small angle before unlatching the latch 7.

Figure 9:
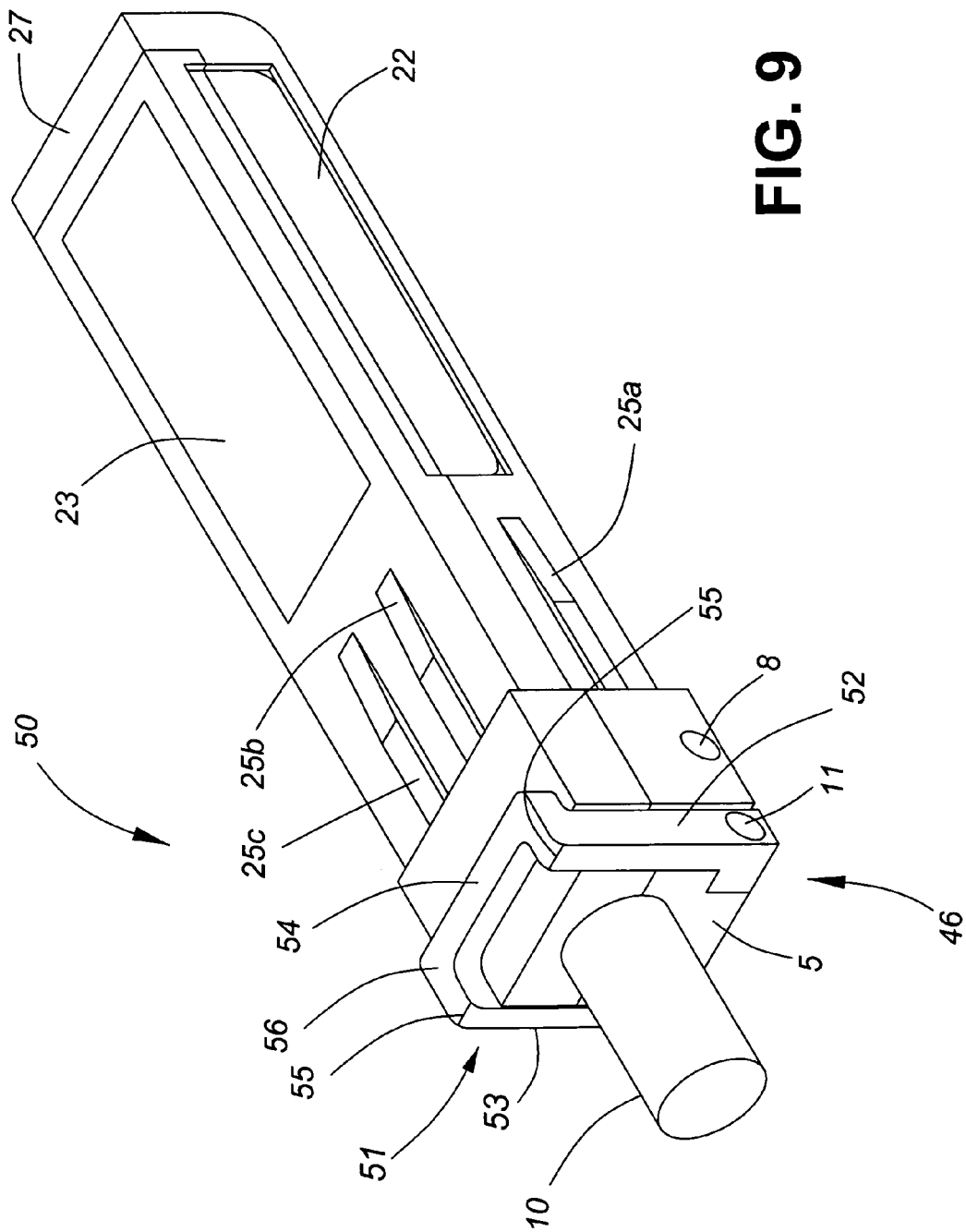
FIG. 9 is an isometric view of an electronic module with a delatching mechanism in accordance with another embodiment of the present invention.
Figure 10:
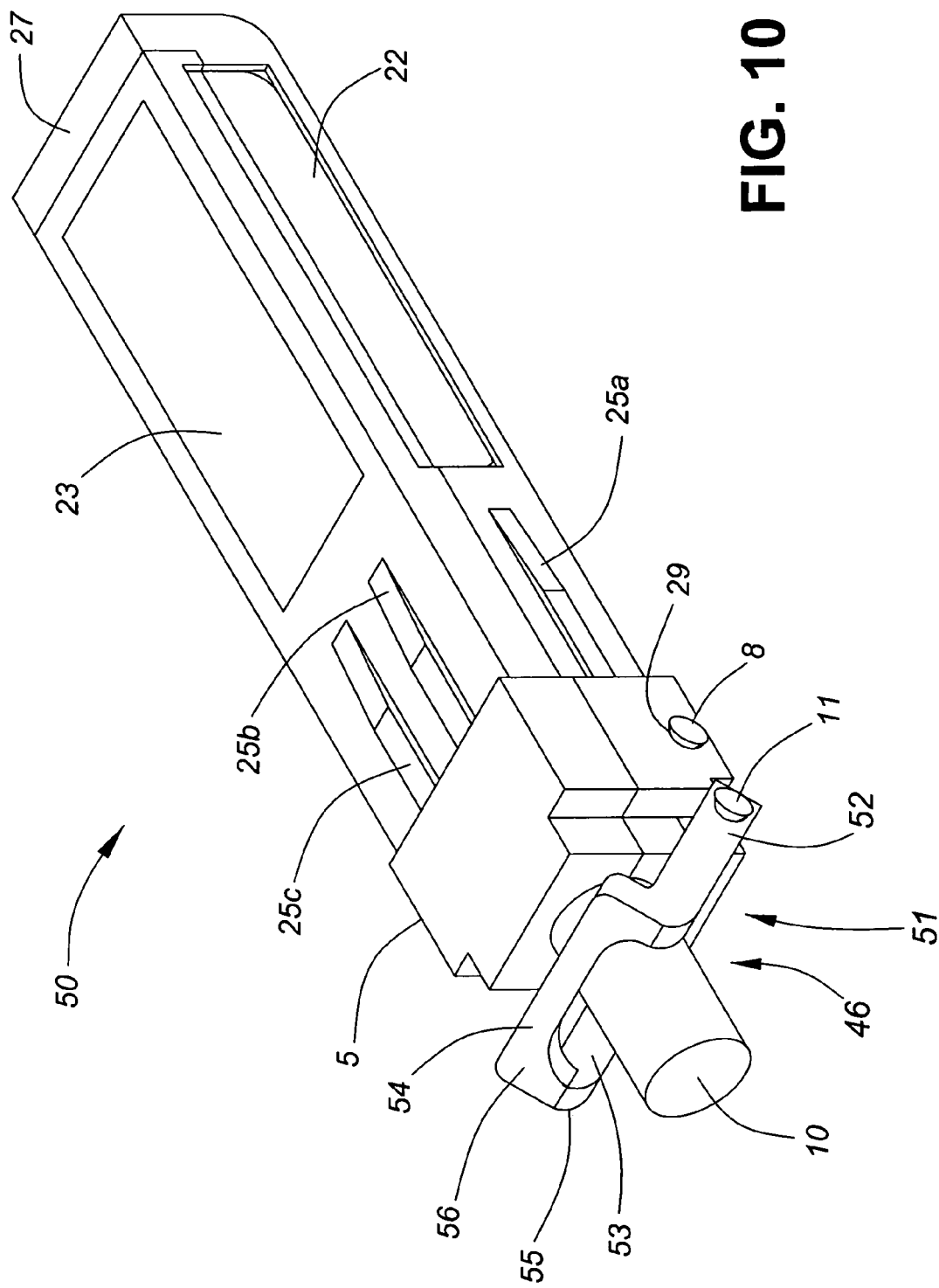
FIG. 10 is an isometric view of an electronic module with the delatching mechanism of FIG. 9 in the release position.
Figure 11:
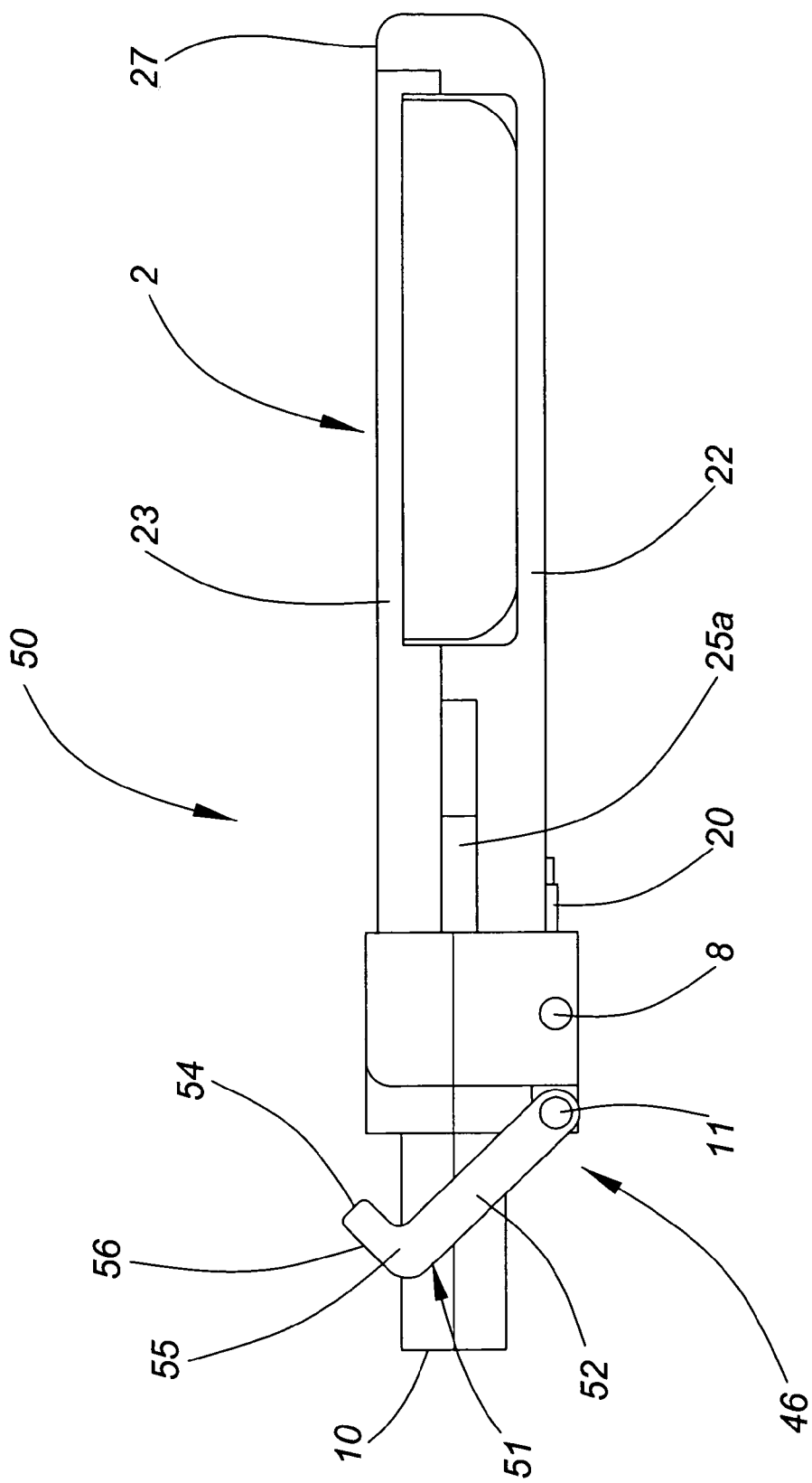
FIG. 11 is a side view of an electronic module with the delatching mechanism of FIGS. 9 and 10 in the release position.

FIGS. 9 to 11 illustrate a second embodiment of a delatching mechanism 46 according to the present invention mounted on an electronic module 50, including a bail handle 51 with first and second side arms 52 and 53, and a cross bar 54, pivoting about the second pivoting pin 11. The remainder of the electronic module 50 is the same as the electronic module 1, including the housing top and bottom 23 and 22, respectively, with a multi-conductor electrical cable 10 extending therefrom. Each side arm 52 and 53 includes an elbow 55 and a horizontal arm section 56, substantially perpendicular to the main side arm sections 52 and 53, and extending along the top of the housing top 23. As can be seen in FIGS. 10 and 11, the elbows 55 and the horizontal arm sections 56 effectively make the main side arms section 52 and 53 and the opening therebetween larger enabling the bail handle 51 to be rotated by a larger angle before contacting the cable 10.

Figure 12:
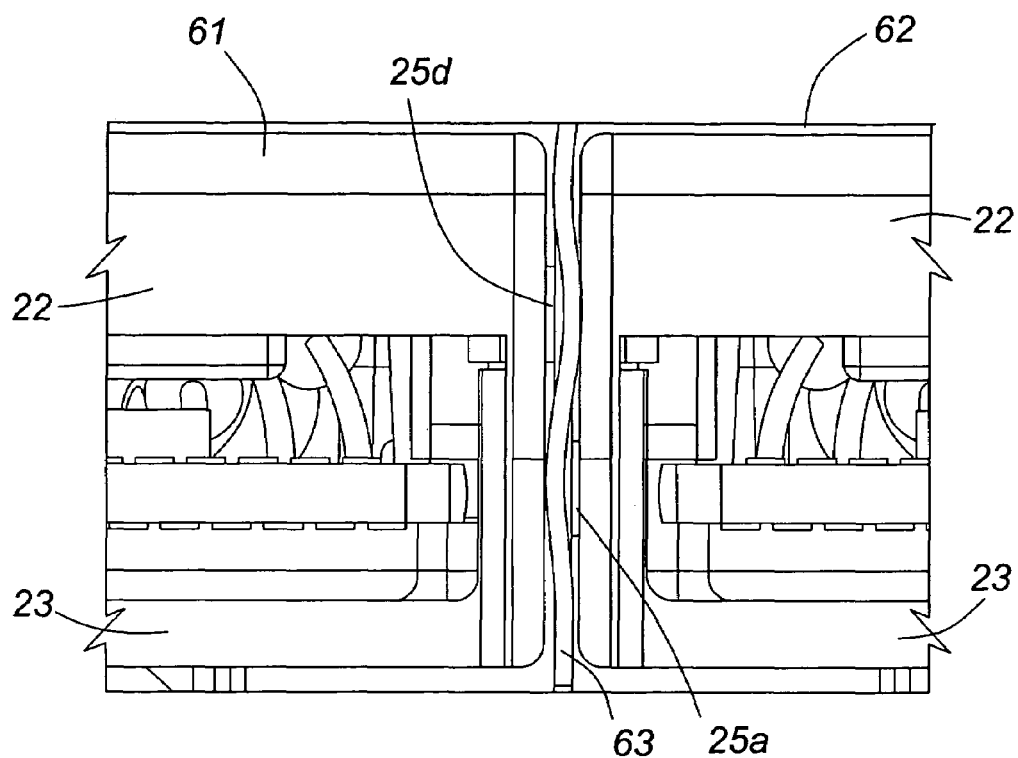
FIG. 12 is a rear view of a pair of the electronic modules of FIGS. 1 and 2 adjacent one another sharing a common receptacle cage wall.

In highly populated cage assemblies, see FIG. 12, a plurality of electronic modules, e.g. transceivers, can be disposed side-by-side, with the adjacent electronic modules 61 and 62 sharing the same cage wall 63. Unfortunately, when electronic modules are equipped with projections 25a and 25d at the same height and position on both sides of the housing 2, i.e. same horizontal plane, insertion and extraction of the modules 1 become very difficult as the projections 25a on one side tend to bend the walls of the cage outwardly into the space designated for the projection of the adjacent module. Accordingly, the walls of the host receptacle will squeeze the module therebetween, requiring excessive force for insertion or extraction. A solution to the problem is to vertically offset the projections 25a and 25d on opposite sides of each housing 2, so that the projections 25a and 25d are not in the same horizontal plane. A simple way to provide this vertical offset is to provide the projection 25a on one side of the housing bottom 23, and to provide the ramp 25d on the opposite side of the housing top 22. In this way, as illustrated in FIG. 12, the lower projection 25a of the module 61 is not directly adjacent the upper projection 25d of the module 62, thereby enabling the cage side wall 63 to bend in two vertically spaced apart places.

We claim:

1. An electronic module for plugging into a host receptacle comprising:

a housing having a first abutment surface;

a printed circuit board mounted within the housing having an electrical connector at one end thereof for electrically connecting the module to a mating connector in the host receptacle;

a latch pivotally connected to the housing about a first axis for releasably holding the module in the host receptacle;

a lever pivotally connected to the latch about a second axis, the lever including a first camming surface;

whereby the lever rotates about the second axis until the first camming surface abuts the first abutment surface, thereafter continued rotation of the lever causes rotation of the latch about the first axis for disengaging the latch from the host receptacle.

2. The module according to claim 1, wherein continued rotation of the lever causes rotation of the lever about a third axis defined by the first camming surface intersecting the first abutment surface.

3. The module according to claim 2, wherein the lever includes a projection, with the first camming surface, extending from an end thereof into a recess, with the first abutment surface, in the housing.

4. The module according to claim 3, wherein the projection includes a rounded surface enabling rotation of the lever inside the recess.

5. The module according to claim 1, wherein the lever comprises a bail.

6. The module according to claim 5, wherein the bail includes a first side arm pivotally connected to the latch, a first projection extending from a first end of the first side arm, and a cross bar extending from a second end of the first side arm; and wherein the first projection includes the first camming surface.

7. The module according to claim 6, wherein the bail further comprises: a second side arm, a first end of which is pivotally connected to the latch and a second end of which is fixed to the cross bar; and a second projection extending from the first end of the second side arm with a second camming surface thereon.

8. The module according to claim 7, wherein continued rotation of the lever causes rotation of the lever about a third axis defined by the first and second camming surfaces intersecting the first and a second abutment surfaces, respectively.

9. The module according to claim 7, further comprising a pivot pin extending through the first end of the first side arm, the first end of the second side arm, and a first end of the latch.

10. The module according to claim 9, further comprising a hook extending from a second end of the latch for engaging a mating latching member on the host receptacle.

11. The module according to claim 7, further comprising a cable fixed to the printed circuit board extending outwardly from the housing.

12. The module according to claim 11, wherein the first and second side arms each include an elbow section proximate the second ends thereof; whereby the cross bar extends across a top of the housing, thereby enabling the bail to rotate through a greater angle before contacting the cable.

13. The module according to claim 1, wherein the housing comprises a top section with a first connector, and a bottom section with a second connector, which interlocks with the first connector; wherein a first pin, defining the first axis, extends through the bottom section, the first and second connectors, and the latch for holding the latch and the housing together.

14. The module according to claim 13, wherein the first pin has an oblong end forming a press fit connection with the bottom section.

15. The module according to claim 14, wherein the lever is a bail having first and second side arms pivotally connected to the latch via a second pin, which extends through the latch and the first and second side arms.

16. The module according to claim 15, wherein the second pin has an oblong end forming a press fit connection with the first side arm.

17. The module according to claim 1, further comprising first and second projections extending from opposite sides of the housing for contacting the host receptacle to reduce electromagnetic emissions therefrom; wherein the first and second projections are vertically spaced apart, whereby adjacent modules do not have directly adjacent projections.

18. The module according to claim 17, wherein the housing comprises an top section and a bottom section; and wherein the first projection is on the top section, and the second projection is on the bottom section.

19. The module according to claim 17, wherein each of the first and second projections includes a ramp at a leading edge thereof to facilitate insertion of the module into the host receptacle.

20. A patch cable for electrically connecting two host devices comprising:
  a first electronic module in accordance with claim 1;
  a second electronic module in accordance with claim 1; and
  a multi-conductor cable having a first end fixed to the printed circuit board in the first electronic module, and a second end fixed to the printed circuit board in the second electronic module.

* * * * *